United States Patent [19]

Addeo

[11] Patent Number: 4,641,318
[45] Date of Patent: Feb. 3, 1987

[54] METHOD FOR IMPROVING THE RELIABILITY OF DATA TRANSMISSION OVER RAYLEIGH FADING CHANNELS

[75] Inventor: Eric J. Addeo, Washington Township, Morris County, N.J.

[73] Assignee: Bell Communications Research, Inc., Livingston, N.J.

[21] Appl. No.: 727,241

[22] Filed: Apr. 25, 1985

[51] Int. Cl.[4] .............................................. H04L 1/02
[52] U.S. Cl. ...................... 375/38; 375/40; 375/58; 375/60; 375/100; 455/52
[58] Field of Search ....................... 375/18, 34, 37, 38, 375/58, 59, 99, 100, 40, 60; 455/33, 50, 52, 54, 59, 101; 370/19, 20, 21, 69.1, 118

[56] References Cited

U.S. PATENT DOCUMENTS

| | | | |
|---|---|---|---|
| 2,880,275 | 3/1959 | Kahn | 455/52 |
| 2,966,583 | 12/1960 | Ross | 455/59 |
| 3,348,150 | 10/1967 | Atal et al. | 455/52 |
| 3,388,330 | 6/1968 | Kretzmer | 375/18 |
| 3,423,729 | 1/1969 | Heller | 375/40 |
| 3,492,578 | 1/1970 | Gerrish et al. | 375/18 |
| 3,511,936 | 5/1970 | Saltzberg | 370/20 |
| 3,622,885 | 11/1971 | Kruszynski et al. | 375/38 |
| 3,652,803 | 3/1972 | Joel, Jr. | 179/18 J |
| 4,029,900 | 6/1977 | Addeo | 375/114 |

OTHER PUBLICATIONS

IEE Transactions on Communications; vol. COM-33, No. 7, Jul. 1985, pp. 665–675.

*Primary Examiner*—Benedict V. Safourek
*Attorney, Agent, or Firm*—James W. Falk; Howard R. Popper

[57] ABSTRACT

A method and apparatus for reducing the bit error probability of data transmitted over a Rayleigh fading channel are disclosed.

A relatively high bit rate serial stream of data is divided into N parallel relatively low bit rate streams of data. A controlled amount of intersymbol interference is introduced in the parallel streams. The N parallel streams are then transmitted simultaneously over the Rayleigh fading channel. Each bit in the N parallel stream of data has a duration longer than the duration of the typical Rayleigh fade. Thus there is a reduced probability that a Rayleigh fade will cause a bit error.

15 Claims, 8 Drawing Figures

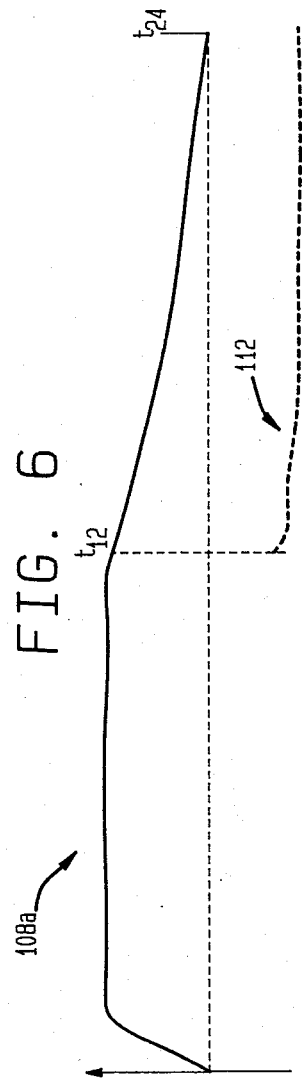
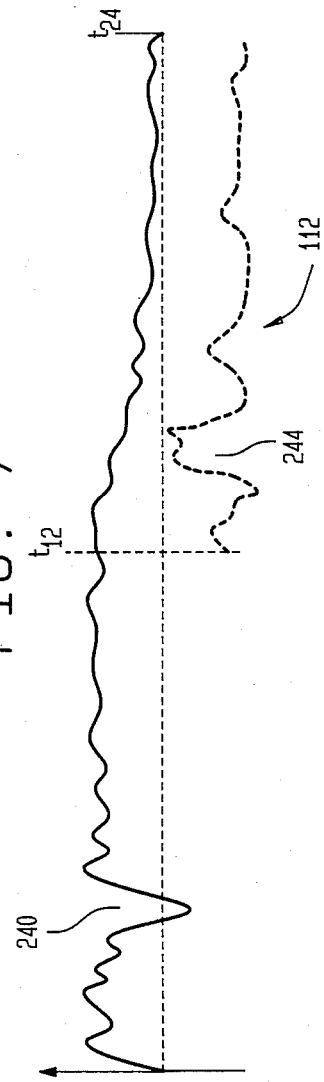

METHOD FOR IMPROVING THE RELIABILITY OF DATA TRANSMISSION OVER RAYLEIGH FADING CHANNELS

FIELD OF THE INVENTION

The present invention relates to an apparatus and a method for reducing the error rate of data transmitted over a Rayleigh fading channel.

BACKGROUND OF THE INVENTION

With the advent of commercial cellular mobile radio, it is now desirable for companies in the communications business to offer information age services, such as remote financial services, and remote data retrieval, to mobile wireless terminals.

Mobile cellular radio systems operate over noisy Rayleigh fading channels. Such mobile cellular radio units often encounter difficulty in recovering data transmitted at the 1200 bit/sec. rate characteristic of the land based telephone network. This difficulty arises because noise including Rayleigh fading is severe.

Rayleigh fading is typically caused by the reflectivity of various types of signal scatterers both stationary and moving. Such signal scatterers, including both natural and man made topological features, give rise to multipath signal propagation. Rayleigh fading is the result of the addition and cancellation of waves propagating along different paths.

Propagation between a base station and a mobile unit is most susceptible to the effects of multipath Rayleigh fading phenomena because all communication is essentially at ground level where there are large numbers of man made and naturally occurring signal scatterers. Rayleigh fading occurs at intervals as low as one to two feet for a vehicle moving in the 25-35 mile per hour range and receiving a cellular radio telephone message over a channel in the 800-900 Megahertz frequency range. In contrast to ground level cellular mobile radio systems, the effects of multipath phenomena are not significant in air-to-ground and satellite-to-earth station communications because the angle of propagation precludes the multipath effects caused by surrounding natural land features and man made structures.

The Rayleigh fading RF channel presents formidable data transmission problems. Consider for example a carrier with a 10 dB mean carrier to noise ratio. For a mobile receiver unit moving at about 35 miles per hour, Rayleigh fading causes the carrier to noise ratio to fade to a level of 10 dB below the mean level approximately 35 times per second. The duration of each such fade averages about 3 milliseconds. When the carrier is modulated with a 1200 bit/sec. stream of data, the duration of each bit is about 0.08 ms. Thus the duration of the typical Rayleigh fade is much longer than the duration of an individual bit. Accordingly, during each fade entire sequences of bits may be destroyed.

If there are 35 Rayleigh fades per second and each fade has a duration of 3 ms then the carrier to noise ratio will be at a level of 10 dB or more below its mean level for about 10% of the time. While the carrier is in the noise, the bit error probability is one half. Therefore, when 1200 bits/sec. are transmitted on a carrier having a mean carrier to noise ratio of about 10 dB, a bit error probability of 5% can be anticipated solely because of Rayleigh fading. For a comparable channel of the land based telephone network, 1200 bits of data can be transmitted per second with a bit error probability that is less than one in ten thousand.

Looking at Rayleigh fading from another point of view, there is an approximately 3-5% probability that a mobile unit moving at 35 mph will receive 4 errors in a given 32 bit word when the mean carrier to noise ratio is about 10 to 15 dB and the data is transmitted at 1200 bits/sec. The probability of such multibit errors per word increases with decreasing vehicle speed.

In order to provide communications age services over the mobile network, the bit error probability of the Rayleigh fading channel must be brought down so that it is comparable or at least closer to the bit error rate of the land based telephone network. One possible approach to this problem is to provide each mobile unit with sufficient computer capacity to execute error correction codes. However, such error correction codes are slow, require a large amount of computer capacity and become vastly more complex as the number of errors per word increases. It is simply not practical to place the mini computers required to execute such error correction codes in a mobile unit. Accordingly, error correction codes are not suitable for improving the reliability of data transmitted over Rayleigh fading channels.

Instead, data must be transmitted over Rayleigh fading channels in a manner such that fewer errors occur. Accordingly, it is the object of the present invention to provide a method and an apparatus for transmitting data over a Rayleigh fading channel which results in a significantly reduced bit error probability.

SUMMARY OF THE INVENTION

The present invention is an apparatus and a method for transmitting data over a Rayleigh fading channel with a reduced bit error probability. This is accomplished by increasing the time duration of each individual bit so that it exceeds the duration of the typical Rayleigh fade. When the duration of a bit is longer than the duration of a typical Rayleigh fade, the Rayleigh fade may cause the bit to become distorted, but the Rayleigh fade will not cause the bit to be lost altogether. As is discussed in detail below, further immunity from errors due to Rayleigh fading may be achieved by introducing a controlled amount of intersymbol interference between adjacent bits.

According to the inventive method, a relatively high bit rate serial stream of data to be transmitted over a Rayleigh fading channel is converted into N parallel relatively low bit rate streams of data. Thus instead of serially transmitting a single relatively high bit rate stream of data, N relatively low bit rate streams of data are transmitted simultaneously. For example, instead of transmitting one stream of data at 1200 bits/sec., 12 streams each comprising 100 bits of data per second are simultaneously transmitted. At 100 bits per second, the duration of each bit is greater than the duration of the typical Rayleigh fade so that the bit error probability is significantly reduced.

A demultiplexing operation is carried out to convert the relatively high bit rate serial stream of data to be transmitted into N relatively low bit rate parallel streams of data. In a preferred embodiment of their invention, each of the N parallel streams is then processed by a low pass filter with a phase delay that is a linear function of frequency. The filter serves to increase the duration of each data bit in the N parallel stream. Each bit may be sufficiently stretched out so that a controlled amount of intersymbol interference is introduced between adjacent bits in the N parallel streams. It is desirable to stretch out each bit as long as possible because longer bits are detected with greater accuracy after transmission over a noisy Rayleigh fading channel. The benefit of increased detection accuracy outweighs the inconvenience of the intersymbol interference which results from stretching out the bits. The stretching of the bits is limited by a desire to avoid FM noise which corrupts very low frequency signals.

After processing by the low pass filters, each of the N separate streams of data is then modulated onto a subcarrier. The choice of frequency used for each subcarrier is significant for minimizing the overall bandwidth. If the subcarrier frequencies do not overlap, interchannel interference can be eliminated. However, this leads to inefficient use of the available bandwidth. A more efficient use of bandwidth occurs when adjacent subchannels are permitted to overlap. However, in this case, it is important to impose an orthogonality constraint on adjacent subcarriers.

After modulating each of the N parallel streams of data onto one of the N subcarriers, the N modulated subcarriers are summed to form a composite signal. This composite signal is then modulated, by means such as narrow band FM modulation, onto a Rayleigh fading channel typically in the 800–900 Mhz range for transmission to a mobile receiver.

At the receiver end, a detector such as a single branch FM receiver with discrimination detection, is used to recover the composite signal comprising the N modulated subcarriers. Each of the N streams of data is then recovered from its subcarrier.

At this point one has N parallel streams of relatively long duration bits. Generally, there is intersymbol interference between adjacent bits in the N parallel streams. Each of the N streams includes a significant amount of random distortions which are the result of transmission over the relatively noisy Rayleigh fading channel. However, few or none of the distortions should have a duration longer than the duration of the individual bits. It is therefore possible to detect the sense of each bit in the N parallel streams with a relatively low error probability. The sense of each bit in the N parallel streams is detected by means of reconstruction circuitry, which circuitry serves to regenerate the N parallel streams of bits without the noise and distortion resulting from transmission over the Rayleigh fading channel and without intersymbol interference. After the sense of each bit in the N parallel steams is detected, the N parallel streams are combined to reform the original high bit rate serial data stream.

Studies indicate that by use of the aforedescribed technique, in which the duration of each bit is increased so that it is longer than the duration of the average Rayleigh fade, and in which a controlled amount of intersymbol interference is introduced between adjacent bits, a two order of magnitude reduction in the bit error probability for data transmitted over a Rayleigh fading channel can be achieved. For a 1200 bit/sec. data stream and a 15 dB mean carrier to noise ratio, a Rayleigh fading channel has a bit error probability of about 5%. When the transmission technique of the present invention is used, studies indicate that the bit error rate for the Rayleigh fading channel drops to about 0.05%. Accordingly, use of the present invention will result in substantial improvement in the reliability of data transmitted over a Rayleigh fading channel.

BRIEF DESCRIPTION OF THE DRAWING

FIGS. 4, 5, 6 and 7 show data signals at various signal processing stages in the transmitter and receiver of FIG. 2 and 3.

DETAILED DESCRIPTION

Figure 1:
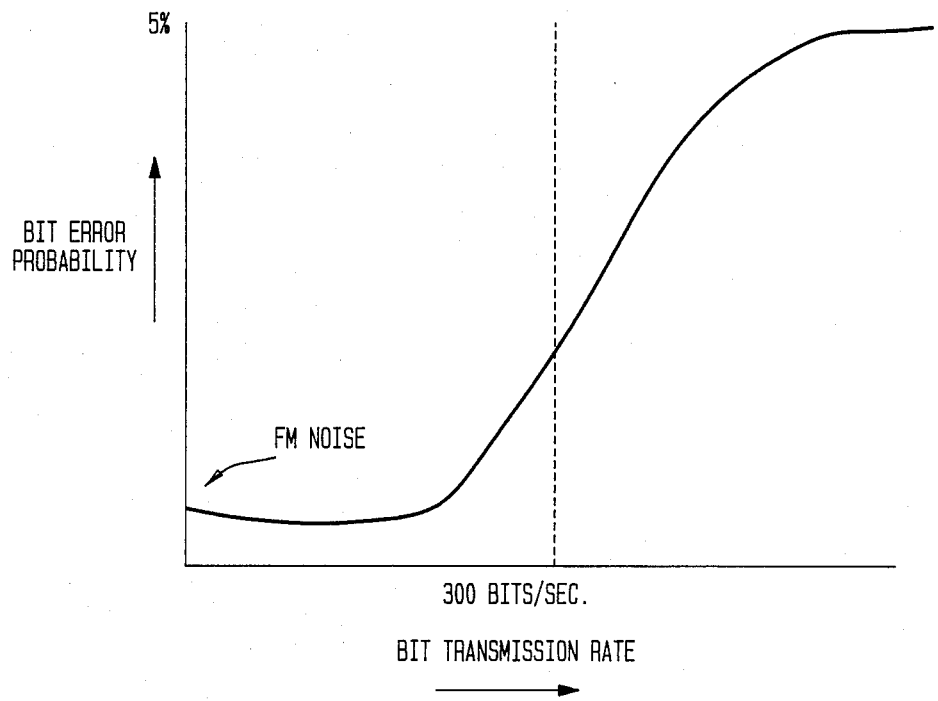
FIG. 1 is a plot of the bit error probability versus the bit transmission rate for a Rayleigh fading channel.

Referring to FIG. 1, a plot of the bit error probability versus the bit transmission rate is schematically illustrated for a Rayleigh fading channel when the mean carrier to noise ratio is on the order of 15 db and the vehicle speed is about 15 mph. As previously discussed, the bit error probability is very high for bit transmission rates above 300 bits/sec. For bit transmission rates below 300 bit/sec., the bit error probability is considerably reduced. The reason for this is that for bit transmission rates below 300 bit/sec., the duration of each bit is longer than the duration of the typical Rayleigh fade. However, it should be noted that at very low bit transmission rates random FM noise causes some increase in the bit error rate. (A discussion of random FM noise can be found in Lee, *Mobile Communications Engineering*, McGraw Hill Book Company 1982).

In accordance with the present invention, a relatively high bit rate stream of data is transmitted over a Rayleigh fading channel by dividing the relatively high bit rate data stream into a plurality of relatively low bit rate steams which are transmitted over the Rayleigh fading channel in parallel. In this manner data can be transmitted at a relatively high rate with relatively reduced bit error probabilities.

Figure 2:
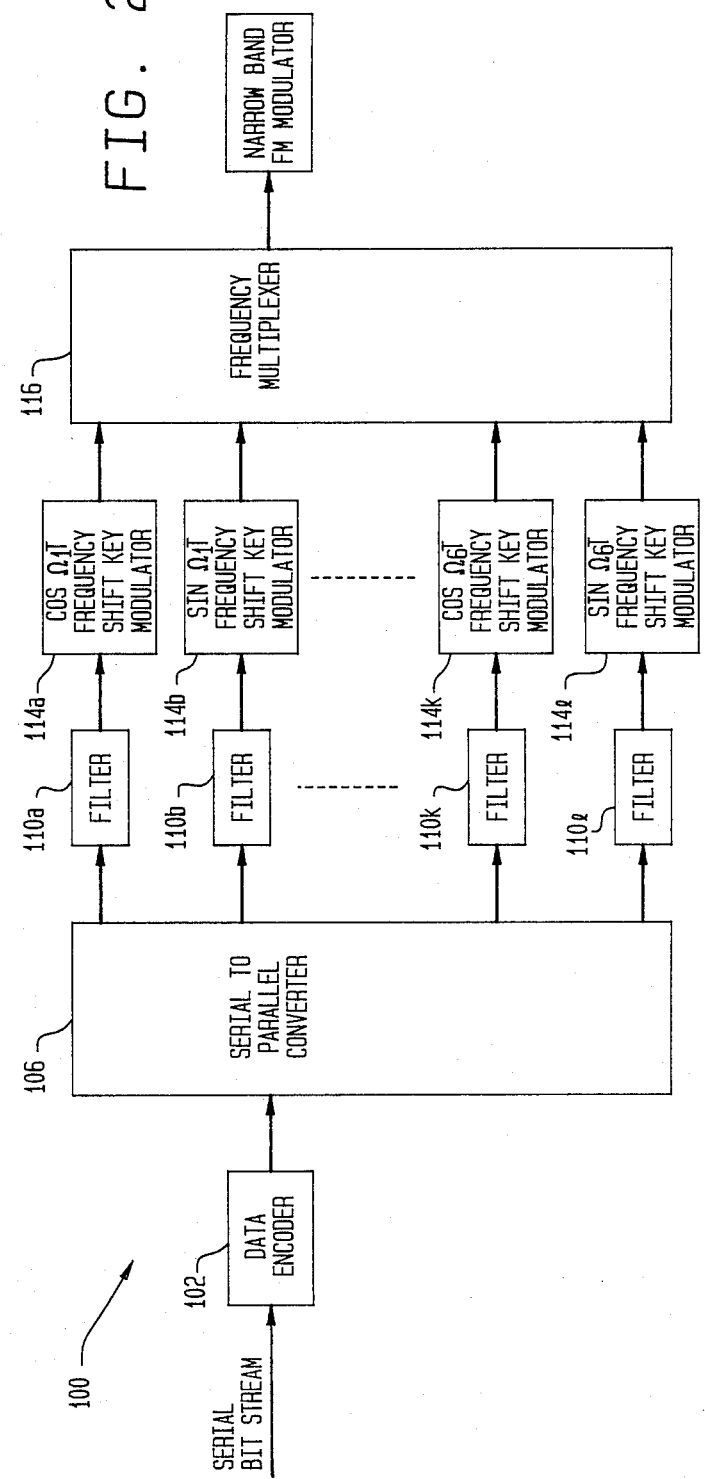
FIG. 2 schematically illustrates a transmitter for transmitting data over a Rayleigh fading channel, in accordance with an illustrative embodiment of the invention.
Figure 3:
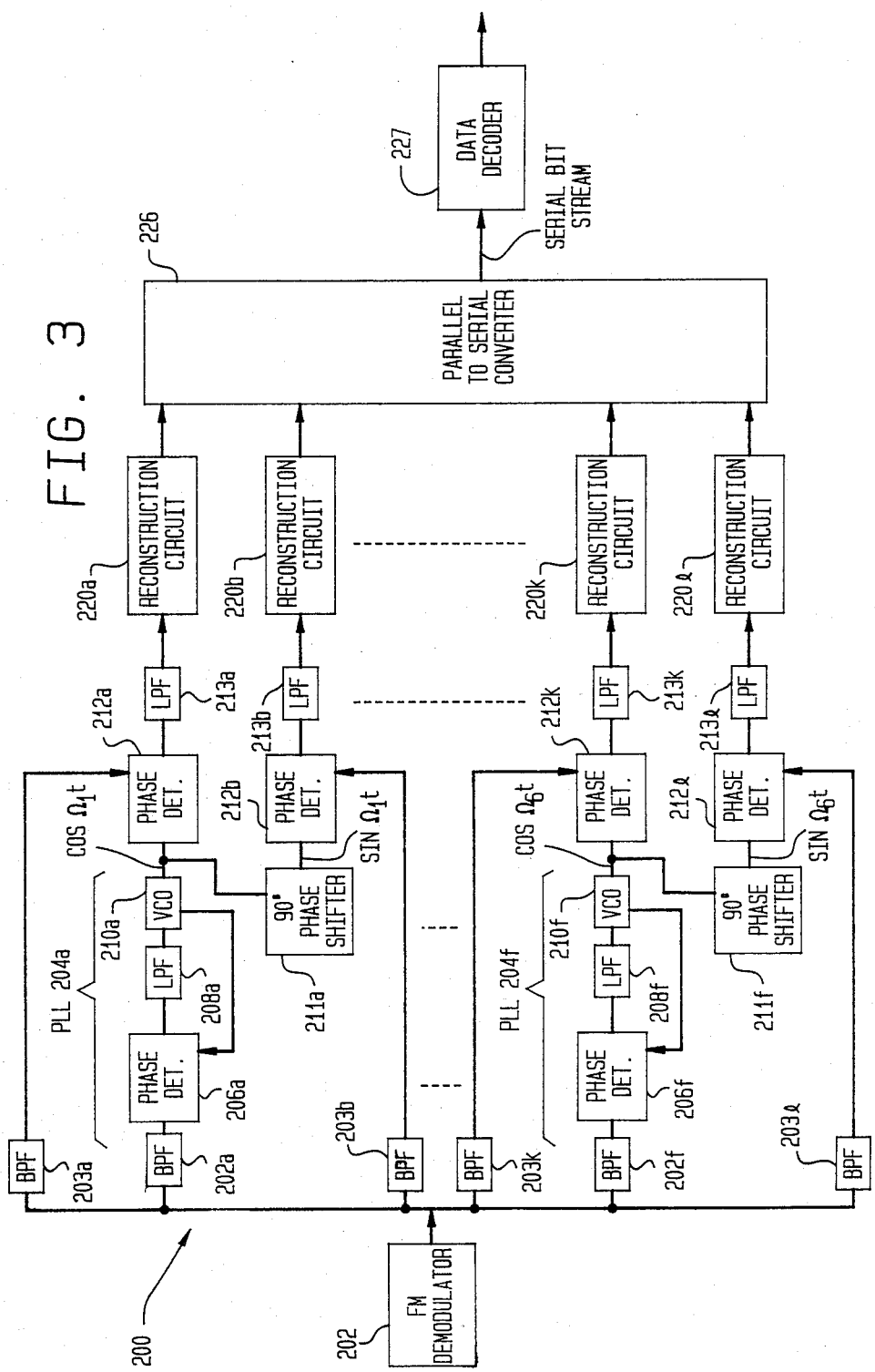
FIG. 3 schematically illustrates a receiver for receiving data transmitted over a Rayleigh fading channel in accordance with an illustrative embodiment of the present invention.

Referring to FIG. 2, a transmitter 100 for transmitting data over a Rayleigh fading channel in accordance with the present invention is schematically illustrated. The transmitted data is received by receiver 200 of FIG. 3 which is typically part of a cellular mobile radio unit.

Looking first at the transmitter 100, the serial stream of data to be transmitted is first processed by data encoder 102. Typically the data encoder 102 is used to encode timing information in the data stream. This is accomplished using standard coding algorithms such as the well known Manchester encoding scheme, which scheme involves exclusive ORing of the data stream and a clock signal.

Figure 4:
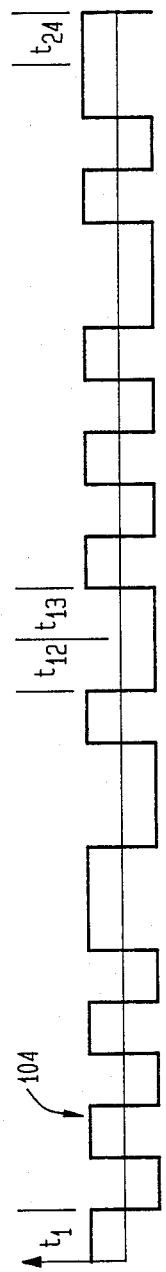

Emanating from the data encoder 102 is a serial stream of bits. A portion 104 of the data stream is shown in FIG. 4. A positive going voltage pulse indicates a logic "1" and a negative going voltage pulse indicates a logic "0". Twenty-four bits of the serial stream of data 104 are shown in FIG. 2. These twenty-four bits occupy time intervals designated $t_1 \ldots t_{24}$.

The serial to parallel converter 106 is used to perform a 1:N demultiplexing operation on data stream 104. For purposes of this discussion, it will be assumed that data stream 104 is a 1200 bit/sec. stream and that N is twelve, i.e. data stream 104 is divided into twelve parallel 100 bit/sec. streams.

The serial to parallel converter 106 is essentially an N bit shift register comprising N latches. To convert N bits of data from serial form to parallel form, the N serial bits become the input sequence to the N bit shift register. When the N bits are in the shift register, the bits are available in parallel form at the outputs of the N latches which comprise the shift register. Examples of such latches include the Fairchild 7475 and 4042 transparent latches.

Figure 5:
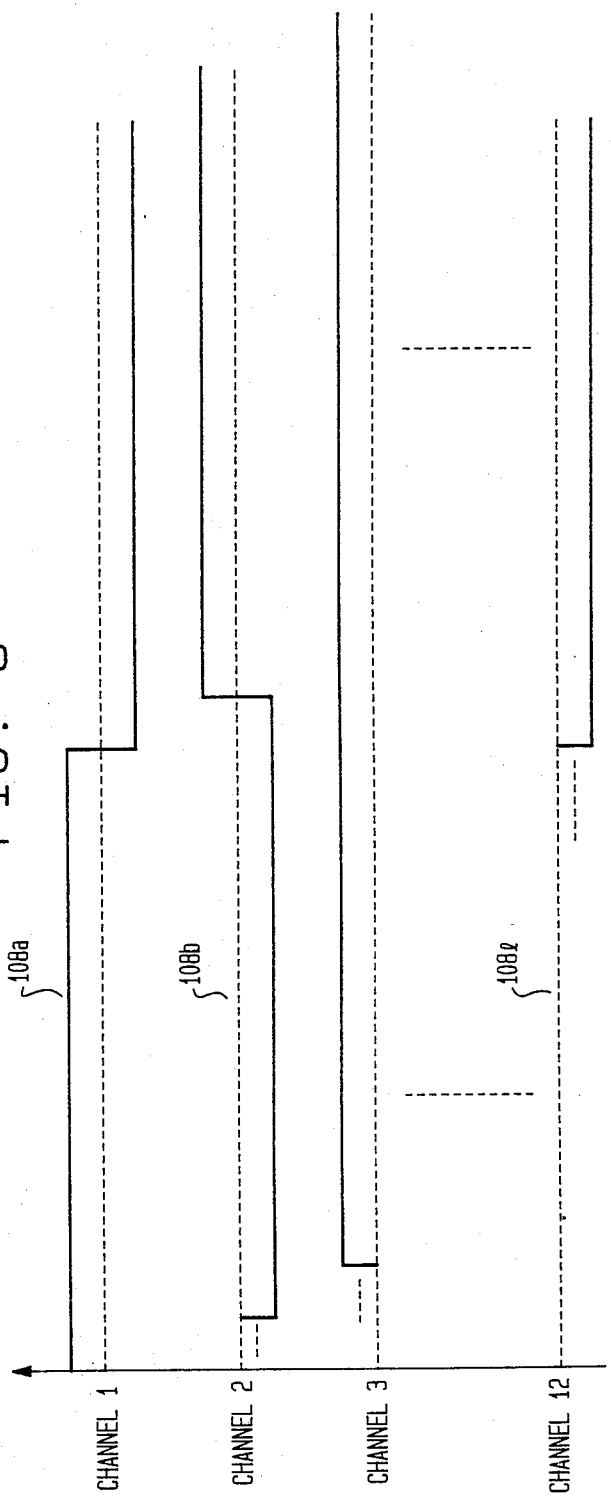

In FIG. 5, the output of the series to parallel converter 106 is shown. The output of the series to parallel converter comprises twelve relatively low bit rate streams, 108-a, 108-b . . . 108-1. Each bit in the streams 108-a . . . 108-1 has a duration which is twelve times as long as the duration of each bit in stream 104 of FIG. 3. Stream 108-a includes the bits occupying time intervals $t_1, t_{13}$ of stream 104. The first bit in stream 108-a occupies the intervals from $t_1$ to $t_{12}$ while the second bit in stream 108-a occupies the interval from $t_{13}$ to $t_{24}$. Stream 108-b includes the bits occupying time intervals $t_2, t_{14}$ of stream 104. The first bit in stream 108-b occupies the interval from $t_2$ to $t_{13}$ and the second bit in stream 108-b occupies the interval from $t_{14}$ to $t_{25}$. Similarly stream 108-1 includes the bits occupying time intervals $t_{12}, t_{24}$ of stream 104. The first bit in stream 108-1 has a duration from $t_{12}$ to $t_{24}$.

In a particular embodiment of the invention, each of the streams 108-a, 108-b . . . 108-1 is then processed by a filter 110-a, 110-b . . . 110-1, respectively. The filters 110-a . . . 110-1 serve to increase the duration of each of the bits in the N parallel streams and to introduce a controlled amount of intersymbol interference between adjacent bits in the streams 108-a . . . 108-1. Illustratively, each of the filters 110-a . . . 110-1 comprises a second order active low-pass filter such as the National 100 Biquad active filter. The active filters have a linear phase characteristic over the passband of about 120 Hz. Illustratively, the group delay $(\tau_g) - d\phi/d\omega$ is a positive constant, where $\phi$ is the phase, and $\omega$ is the angular frequency. This means that each of the Fourier components comprising the data signals 108-a . . . 108-1 is delayed a constant amount by the filters 110-a . . . 110-1, i.e., the group delay of each Fourier component is constant. The cutoff frequency of each of the filters 110-a . . . 110-1 is about 1.20 times the bandwidth of the channel.

FIG. 6 shows the data stream 108-a after it has been processed by the filter 110-a. The first bit of stream 108-a is shown in FIG. 6 as a solid line and the second bit of stream 108-a is shown as a dotted line. As shown in FIG. 6, each of the bits comprising the stream 108-a has been spread out so that it has a longer duration and overlaps with the adjacent bits. Thus, the first bit in stream 108-a now extends from $t_1$ to $t_{24}$ rather than from $t_1$ to $t_{12}$ as it did before processing by filter 110-a. The overlap or intersymbol interference between the first and second bits in stream 108-a extends from $t_{12}$ to $t_{24}$ in FIG. 6 and is designated by numeral 112. Thus the duration of each bit in stream 108-a is increased by a factor of 2. As shown in FIG. 6, the duration of each bit is increased by adding a tail to the end of each bit. For example, the first bit in stream 108-a now extends from $t_1$ to $t_{24}$, however, the area under the portion from $t_{12}$ to $t_{24}$ is only about one third the area under the portion from $t_l$ to $t_{12}$.

Filters 110-a . . . 110-1 are used because it is desirable to introduce a controlled amount of intersymbol interference between adjacent bits in the streams 108-a . . . 108-1 before transmission over the relatively noisy Rayleigh fading channel. The use of controlled intersymbol interference enables a significant increase in the duration of each bit in streams 108-a . . . 108-1 and a corresponding increase in the probability of its detection without error, following transmission over the Rayleigh fading channel. As indicated previously, the only limitation on the bit duration is random FM noise, which will be a problem for extremely long duration bits. To avoid the problem of FM noise, it may be desirable to limit duration of each bit to approximately 0.02 sec.

The twelve parallel data streams 108-a . . . 108-1 which emanate from filters 110-a . . . 110-1 are then used to frequency modulate twelve separate subcarriers. The modulation is illustratively performed by means of frequency shift key modulators 114-a, 114-b . . . 114-1. The choice of frequencies $\Omega_a \ldots \Omega_1$ for each of the subcarriers is important for minimizing overall bandwidth. If the subcarrier frequencies $\Omega_a \ldots \Omega_1$ are sufficiently separated, interchannel interference can be eliminated. However, this leads to inefficient use of bandwidth. A more efficient use of bandwidth is achieved when adjacent subcarriers are permitted to overlap. However, in this case it is important to impose an orthogonality constraint on adjacent subcarrier pairs.

Thus, the twelve subcarriers comprise six subcarrier pairs, each pair comprising two orthogonal subcarriers. The six orthogonal subcarrier pairs have the forms cos $\Omega_1 t$, sin $\Omega_1 t$ . . . cos $\Omega_6 t$, sin $\Omega_6 t$. Data stream 108-a is modulated onto a subcarrier having the form cos $\Omega_1 t$ and data stream 108-b is modulated onto a subcarrier having the form sin $\Omega_1 t$. Similarly data stream 108-c is modulated onto a subcarrier having the form cos $\Omega_2 t$ and data stream 108-d is modulated onto a subcarrier having the form sin $\Omega_2 t$. Because the adjacent subcarriers are orthogonal, there is little or no interference between adjacent subcarriers.

After the data streams 108-a . . . 108-1 are modulated onto the subcarriers by means of frequency shift key modulators 114-a . . . 114-1, the modulated subcarriers are summed by means of frequency multiplexer 116 to form a composite signal. The composite signal is then modulated onto a Rayleigh fading channel by means of the modulator 118 for transmission to or from a mobile unit. Typically, the modulator 118 is a conventional narrow band FM modulator.

In the aforesaid manner a relatively high bit rate serial stream of data 104 is transmitted over a Rayleigh fading channel with a reduced error probability. This is accomplished by dividing the relatively high bit rate serial data stream into a plurality of relatively low bit rate parallel data streams and by introducing a controlled amount of intersymbol interference between adjacent bits in the parallel streams.

Turning now to the receiver 200, the composite signal is demodulated from the Rayleigh fading channel by means of FM demodulator 202. Preferably, the FM demodulator 202 is a standard narrow band FM receiver with discriminator detection.

Following demodulation of the composite signal from the Rayleigh Fading Channel, the parallel streams of data 108-a . . . 108-1 are demodulated from their respective subcarriers. This is accomplished in two steps. First, the unmodulated subcarriers cos $\Omega_1 t$, sin $\Omega_1 t$ . . . cos $\Omega_6 t$, sin $\Omega_6 t$ are recovered by the receiver 200 and then the recovered unmodulated subcarriers are used to regenerate the parallel streams 108-a ... 108-1 of data from the modulated subcarriers.

Illustratively, each of unmodulated subcarrier recovery circuits 204-a ... 204-f is a phased locked loop. Each of the phase locked loops 204-a ... 204-f comprises a phase detector 206-a ... 206-f, a low pass filter 208-a ... 208-f and a voltage controlled oscillator 210-a ... 210-f. Instead of the phase detectors 206-a ... 206-f, four quadrant multipliers may be used. Each phase lock loop subcarrier recovery circuit is used to regenerate one unmodulated subcarrier from each orthogonal subcarrier pair. Phase shifters 212-a ... 212-1 are used to generate the other unmodulated subcarrier in each pair.

The phase locked loop subcarrier recovery circuits 204-a ... 204-f can generally be understood as follows. First, the output of FM demodulator 202 is filtered by narrow passband filters 202-a ... 202-f. Each of filters 202-a ... 202-f passes one orthogonal modulated subcarrier pair, i.e., each of filters 202-a ... 202-f passes the modulated subcarriers of frequency $\Omega_1 \ldots \Omega_6$, respectively.

Thus, one input to the phase detection 206-a, comprises the modulated subcarriers $\cos \Omega_1 t$, $\sin \Omega_1 t$. The output of the voltage controlled oscillator is a sinusoidal waveform of frequency $\Omega_1$. The output of the phase detector 206-a comprises a D. C. term as well as components of the input frequency and its harmonics. The low pass filter 208 has a narrow bandwidth and it removes the input frequency components as well as the harmonic components, leaving the dc component. The output of the low pass filter 208 serves as the control voltage for the voltage controlled oscillator 210. The control voltage causes the output of the voltage controlled oscillator 210 to adjust itself in a manner so that it becomes phase locked to one of the frequency $\Omega_1$ subcarriers such as the $\cos \Omega_1$ subcarrier. Thus the output of the voltage controlled oscillator 210-a is the unmodulated $\cos \omega_1 t$ subcarrier.

The orthogonal subcarrier $\sin \Omega_1 t$ is obtained by shifting the output of voltage controlled oscillator 210-a by 90°. Thus the output of phase shifter 211-a is the orthogonal subcarrier $\sin \Omega_1 t$.

In this manner, the phase locked loop 204-a when used in combination with phase shifter 211-a can be used to regenerate the unmodulated subcarrier pair $\cos \Omega_1 t$, $\sin \Omega_1 t$. The phase locked loops 204-b ... 204-f operate in a similar manner to regenerate the other unmodulated subcarriers, i.e., $\cos \Omega_2 t$, $\sin \Omega_2 t$ ... $\cos \Omega_6 t$, $\sin \Omega_6 t$.

The data streams 108-a ... 108-1 are demodulated by means of narrow band pass filters 203-a ... 203-1, phase detectors 212-a ... 212-1, and low pass filters 213-a ... 213-1. Illustratively, data stream 108-a is detected as follows. Band pass filter 203-a filters the output of FM demodulators 201 so that only the modulated $\cos \Omega_1 t$ and $\sin \Omega_1 t$ subcarriers are input to the phase detector 212-a. The other input to phase detector 212-a is the regenerated unmodulated subcarrier $\cos \Omega_1 t$ produced by voltage controlled oscillator 210-a. The output of the phase detector 212-a comprises a D. C. term, as well as components of the input frequency $(\Omega_1)$ and its harmonics. The input frequency $(\Omega_1)$ and harmonic components are removed by low pass filter 213-a leaving only the D. C. term. This D. C. term is a replica of the data stream 108-a which was modulated into the $\cos \Omega_1 t$ subcarrier.

Similarly, the inputs to phase detector 212-b the modulated $\cos \Omega_1 t$ and $\sin \Omega_1 t$ subcarriers as well as the regenerated unmodulated $\sin \Omega_1 t$ subcarrier produced by VCO 210-a and phase shifter 211-a. The output of the phase detector 212-b comprises a D. C. term and components of the input frequency $\Omega_1$ and harmonics of the input frequency. The input frequency and harmonic terms are removed by low pass filter 213-b, leaving only the D. C. term, which is a replica of the data stream 108-b. In this manner low pass filters 203-c ... 203-1, phase detectors 212-c ... 212-1 and low pass filters 213-c ... 213-1 are used to detect the streams 108-c ... 108-1.

FIG. 7 shows the data stream 108-a after it has been demodulated from its subcarrier. FIG. 7 shows the same two long duration, low amplitude bits as are shown in FIG. 6. The region of intersymbol interference or overlap between adjacent bits is designated 112. As a result of transmission over a Rayleigh fading channel, a significant amount of distortion has been introduced into the data stream 108-a. The distortions introduced by Rayleigh fades are designated 240, 244. Note that each of the distortions 240, 244 has a shorter duration than the bit itself. Thus even though the bits are distorted, no information is destroyed as a result of the Rayleigh fades.

After the streams 108-a ... 108-1 have been demodulated from the subcarriers, the sense of each bit in the streams 108-a ... 108-1 is detected. The sense of the bits are detected by means of reconstruction circuits 220-a ... 220-1. The outputs of the reconstruction circuits 220-a ... 220-1 are the undistorted data streams 108-a ... 108-1 shown in FIG. 5. Thus, the reconstruction circuits 220-a ... 220-1 serve to regenerate the streams 108-a ... 108-1 substantially without the noise and distortion resulting from transmission over the Rayleigh fading channel and without intersymbol interference.

The sense of each bit in streams 108-a ... 108-1 may be detected by means of the following algorithm. Each stream of data is integrated over successive bit periods and the integral signal value obtained at the end of each bit period as a result of the integration is stored. (The bit periods for each of the strea ... 108-a ... 108-1 correspond to the duration of the bits in the undistorted data streams of FIG. 4. More particularly, the bit periods of stream 108-a are $t_1$–$t_{12}$, $t_{13}$–$t_{24}$, $t_{25}$–$t_{36}$, etc. The bit periods of stream 108-b are $t_2$–$t_{13}$, $t_{14}$–$t_{25}$, $t_{26}$–$t_{37}$, etc.) The integrated signal value for the most recent bit period is summed with the integrated signal value for the immediately preceeding bit period. If the sum is larger than zero, the sense of the bit in the immediately preceeding bit period is a logic "1". If the sum is smaller than zero, the sense of the bit in the immediately proceeding bit period is logic "0".

Figure 8:
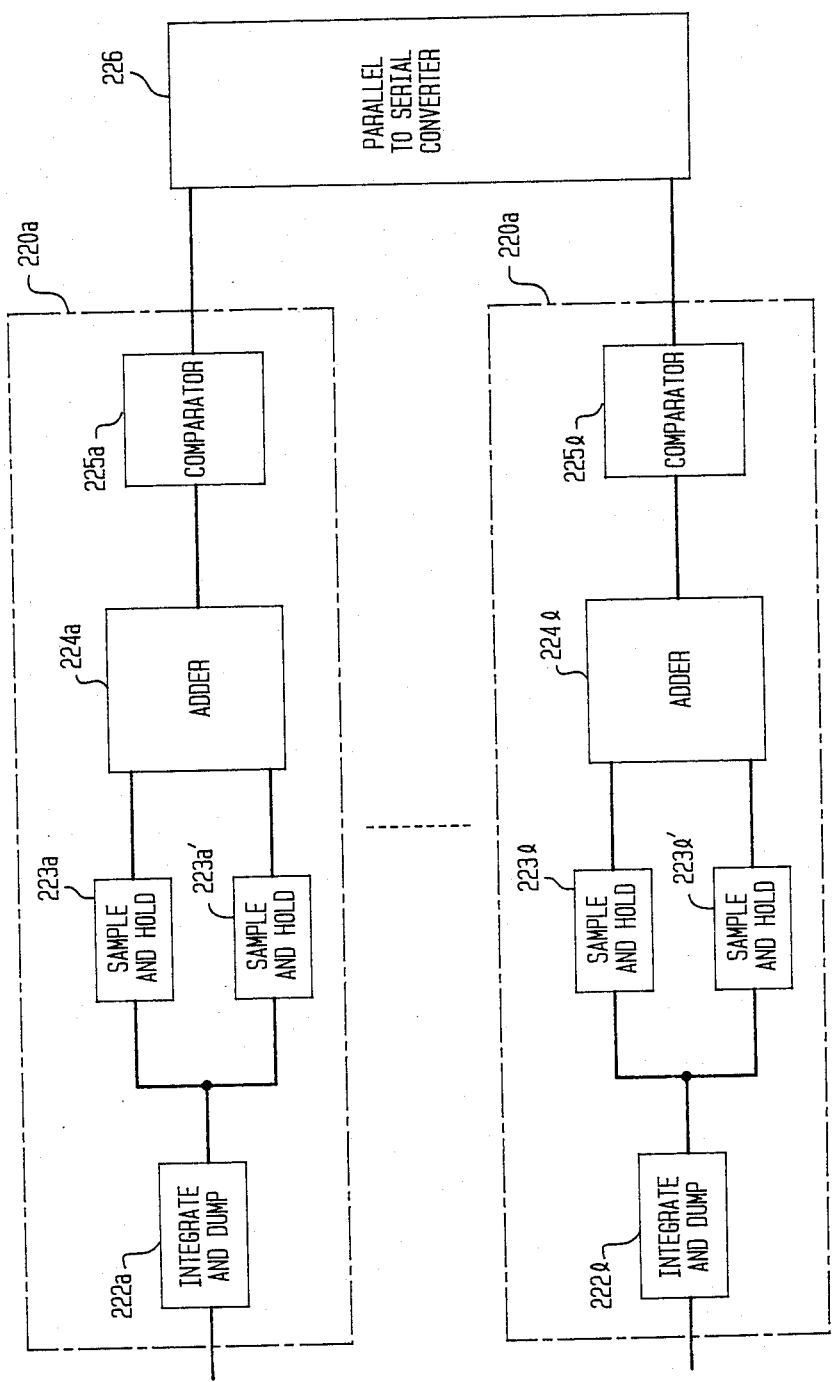
FIG. 8 schematically illustrates reconstruction circuitry which is used to detect the sense of each bit that has been transmitted over the Rayleigh fading channel.

Circuitry for implementing this algorithm is shown in FIG. 8. The reconstruction circuits 220-a ... 220-1 comprise integrate and dump networks 222-a ... 222-1. The integrate and dump networks 222-a ... 222-1 are designed to successively integrate the streams 108-a ... 108-1 over successive bit periods. After each bit period the integrated signal value obtained by each of the integrate and dump networks 222-a ... 222-1 is stored in one of the sample and hold networks 223-a, 223-a' ... 223-1, 223-1'. Signal values stored in the sample and hold circuits are summed by adders 224-a ... 224-1 and the resulting sums are compared with reference levels in comparators 225-a ... 225-1.

Operation of the reconstruction circuits 220-a ... 220-1 will be explained in connection with data stream 108-a and reconstruction circuit 220-a. The integrate and dump network 222-a integrates stream 108-a from time $t_1$ to $t_{12}$ and the integrated signal value thus obtained is stored in sample and hold network 223-a and dumped from integrator 222-a. The integrate and dump network 222-a then proceeds to integrate stream 108-a from $t_{13}$ to $t_{24}$. The integrated signal value so obtained is stored in sample and hold circuit 223-a' and dumped from integrator 222-a. At $t_{24}$ the signals stored in the sample and hold circuits 223-a, 223-a' are summed by adder circuit 224-a. This sum is compared with a reference level such as zero in comparator 225. If the sum is larger than zero the bit whose duration is from $t_1$ to $t_{12}$ is a logic "1" and the appropriate positive voltage appears at the output of comparator 225-a. If the sum is smaller than zero the bit whose duration is from $t_1$ to $t_{12}$ is a logic "0" and the appropriate negative voltage appears at the output of comparator 225-a. In this manner the sense of the first bit in stream 108-a is detected.

From $t_{25}$ to $t_{36}$, the integrate and dump network 222-a again integrates stream 108-a. The integrated signal value obtained at $t_{36}$ is then stored in sample and hold circuit 223-a replacing the previous value stored therein. At $t_{36}$ the integrated signal values stored in sample and hold circuits 223-a, 223-a' are summed by adder 224 and the resulting sum is compared to a reference signal in the comparator 225 to obtain the sense of the bit in stream 108-a whose duration is from $t_{13}$ to $t_{24}$. By successively repeating the above described process, the entire stream of bits 108-a may be regenerated.

The streams 108-b . . . 108-1 are regenerated in an entirely analogous fashion by reconstruction circuits 220-b . . . 220-1, respectively. Note that the reconstruction circuits 220-a . . . 220-1 cause a delay of one bit period for each of the data streams 108-a . . . 108-1.

Use of intersymbol interference and the abovedescribed reconstruction circuitry allows each bit to be integrated over two bit periods rather than one, as would be the case if no intersymbol interference is used. The greater accuracy obtained by integrating each bit over two bit periods generally outweighs the inconvenience caused by reconstruction circuits 220-a . . . 220-1 which are needed to detect the sense of each bit in the presence of intersymbol interference. This enables each bit to be detected with greater accuracy.

After processing by reconstruction circuits 220-a . . . 220-1, the relatively low bit rate parallel streams of data 108-a . . . 108-1 are recombined into a relatively high bit rate serial stream of data by means of conventional parallel to serial converter 226, so as to recover the serial stream of data 104 of FIG. 4. After the parallel to serial conversion, any information such as timing information which was encoded on the serial stream of data by encoder 102 is recovered by means of decoder 227.

Finally, the above described embodiments of the invention are intended to be illustrative only. Numerous alternative embodiments may be devised by those skilled in the art without departing from the scope of the following claims.

What is claimed is:

1. A method for tansmitting a relatively high bit rate serial stream of data over a Rayleigh fading channel within a predetermined bandwidth comprising the steps of converting said relatively high bit rate serial stream of data into N (N>1) parallel relatively low bit rate streams of data, stretching each bit in each of said N parallel streams to persist into the bit interval that would normally be occupied by a successive one of said bits and for a duration longer than the duration of the typical fade of said Rayleigh fading channel, and modulating each of a plurality of subcarriers positioned within said predetermined bandwidth in accordance with a respective one of said successive bits.

2. The method of claim 1 wherein predetermined ones of said subcarriers are of the same frequency but of orthogonal phase.

3. A method for transmitting a relatively high bit rate serial stream of data over a Rayleigh fading channel, said method comprising the steps of
   (a) converting said relatively high bit rate serial stream of data into N parallel relatively low bit rate streams of data, the duration of each bit in said N parallel streams being longer than the duration of the typical Rayleigh fade of said Rayleigh fading channel;
   (b) modulating N separate subcarriers, each of said N separate subcarriers being modulated with one of said N parallel streams of data;
   (c) forming a composite signal by summing said N modulated subcarriers; and
   (d) modulating said composite signal onto a carrier having the frequency of said Rayleigh fading channel.

4. The method of claim 3 wherein said subcarriers comprise pairs of orthogonal waveforms.

5. A method for transmitting a relatively high bit rate serial stream of data over a Rayleigh fading channel, said method comprising the steps of
   (a) converting said relatively high bit rate serial stream of data into N parallel relatively low bit rate streams of data;
   (b) introducing intersymbol interference between adjacent bits in said N parallel streams of data;
   (c) modulating N separate subcarriers, each of said subcarriers being modulated with one of said N parallel streams of data;
   (d) forming a composite signal by summing said N modulated subcarriers; and
   (e) modulating said composite signal onto a carrier having the frequency of said Rayleigh fading channel.

6. The method of claim 5 wherein said intersymbol interference is introduced by passing each of said N parallel streams through a low pass filter.

7. The method of claim 5 wherein said subcarriers comprise pairs of orthogonal waveforms.

8. A method for transmitting and receiving a relatively high bit rate serial stream of data,
   said data being transmitted by a method comprising the steps of
   (a) converting said relatively high bit rate serial stream of data into N parallel relatively low bit rate streams of data; the bits in said N parallel streams having a predetermined bit period,
   (b) introducing intersymbol interference between adjacent bits in said N parallel streams by increasing the duration of each bit in said N parallel streams so that it is longer than said bit period;
   (c) modulating N separate subcarriers, each of said N separate subcarriers being modulated by one of said N parallel streams of data;
   (d) forming a composite signal by summing said N modulated subcarriers; and
   (e) modulating said composite signal onto a Rayleigh fading channel and transmitting said composite signal over said Rayleigh channel, said data being received by a method comprising the steps of
(a) demodulating said composite signal from said Rayleigh fading channel;
(b) demodulating said N parallel streams of data from said N subcarriers;
(c) detecting the sense of each bit in said N parallel streams, so as to regenerate said N parallel streams substantially without the noise and distortion resulting from transmission over said Rayleigh channel and substantially without said intersymbol interference; and
(d) recombining said N regenerated parallel streams into said relatively high bit rate serial stream of data.

9. The method of claim 8 wherein said intersymbol interference is introduced by passing each of said N parallel streams of data through a low pass filter.

10. The method of claim 8 wherein the sense of each bit in one of said N parallel bit streams is detected by means of a process comprising the steps of
integrating said one bit stream over successive bit periods and successively storing the integrated signal values so obtained, and
summing the most recent integrated signal value with the immediately preceeding integrated signal value and comparing the sum so obtained with a reference signal value.

11. A method for receiving a signal transmitted to or from a mobile unit over a Rayleigh fading channel, said signal comprising N (N>1) relatively low bit rate parallel streams of data, there being intersymbol interference between adjacent bits in said N parallel streams, each of said N parallel streams of data being modulated onto a subcarrier, said method comprising the steps of
(a) demodulating said signal from said Rayleigh fading channel;
(b) demodulating said N parallel streams of data from said N subcarriers;
(c) detecting the sense of each bit in said N parallel streams including integrating each stream over successive bit periods and storing the integrated signal values so obtained, and summing the most recent integrated signal value with the immediately preceding integrated signal value and comparing the sum so obtained with a reference signal value; and
(d) combining said N detected parallel data streams into a single relatively high bit rate data stream.

12. An apparatus for transmitting a relatively high bit rate stream of data over a Rayleigh fading channel, said apparatus comprising
(a) means for converting said relatively high bit rate stream of data into N parallel relatively low bit rate streams of data;
(b) a plurality of subcarrier modulating means for modulating each of N separate subcarriers in accordance with the content of a respective bit of said N parallel streams of data for a duration longer than that of the Rayleigh channel fade;
(c) summing means for summing said N modulated subcarriers for form a composite signal; and
(d) carrier modulating means for modulating said composite signal onto a carrier having the frequency of said Rayleigh fading channel.

13. The apparatus of claim 12 wherein said subcarriers comprise pairs of orthogonal waveforms.

14. An apparatus for transmitting a relatively high bit rate serial stream of data over a Rayleigh fading channel,
said apparatus comprising
(a) means for converting said relatively high bit rate serial stream of data into N parallel relatively low bit rate streams of data;
(b) filter means for increasing the duration of each bit in said N parallel streams of data so that there is intersymbol interference between adjacent bits;
(c) subcarrier modulating means for modulating N subcarriers, each subcarrier being modulated with one of said N parallel streams of data;
(d) summing means for summing said N modulated subcarriers to form a composite signal;
(e) carrier modulating means, for modulating said composite signal onto a carrier having the frequency of said Rayleigh fading channel.

15. The apparatus of claim 14 wherein said filter means comprises a low pass filter with a group delay that is a linear function of frequency.

* * * * *